Sept. 15, 1959 E. A. WAGNER ET AL 2,903,959
COOKING APPLIANCE GRID MOUNTING
Filed Aug. 26, 1954
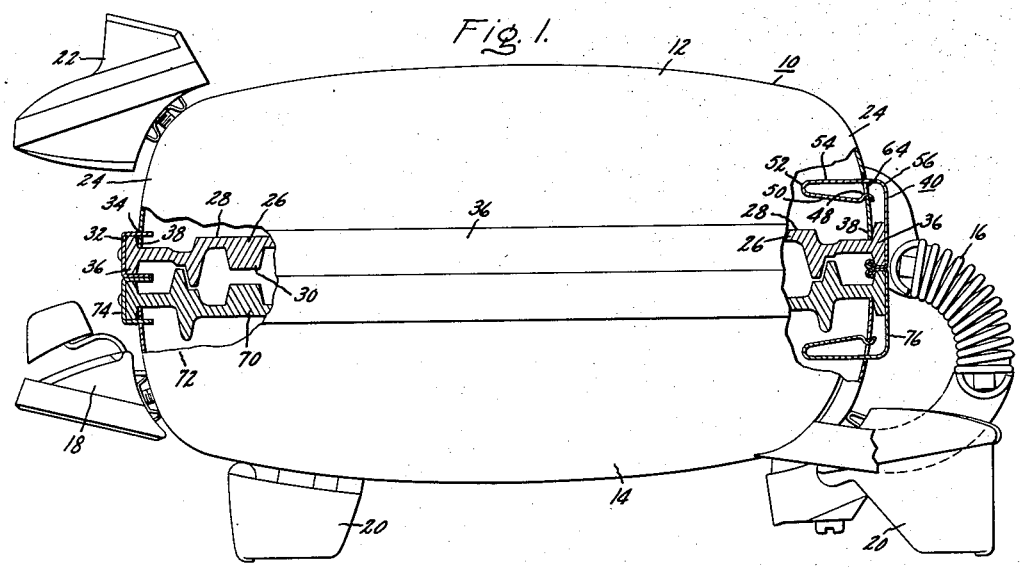
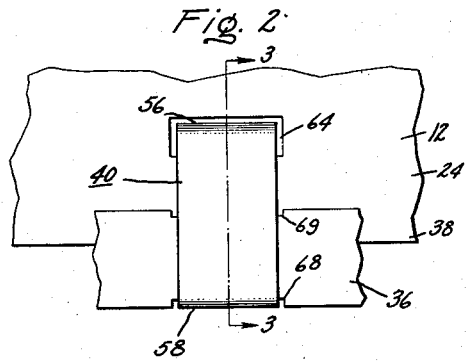
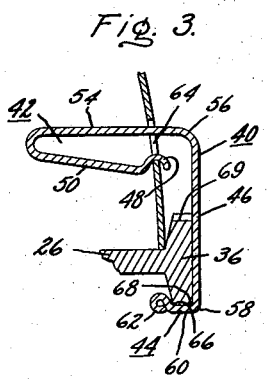
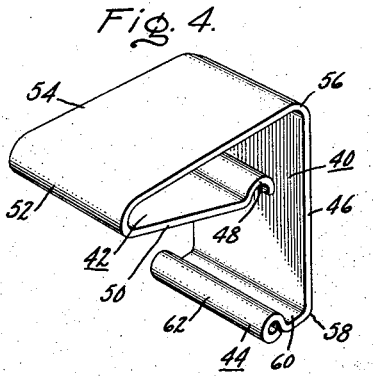
Inventors:
Ernest A. Wagner,
Arthur H. Freeman,
by Frank L. Neuman
Their Attorney.

United States Patent Office 2,903,959
Patented Sept. 15, 1959

2,903,959

COOKING APPLIANCE GRID MOUNTING

Ernest A. Wagner and Arthur H. Freeman, Allentown, Pa., assignors to General Electric Company, a corporation of New York Application August 26, 1954, Serial No. 452,342

9 Claims. (Cl. 99—376)

This invention relates to a mounting for a removable member, and particularly to an arrangement for detachably mounting a reversible cooking grid to a cooking appliance.

Most cooking appliances include one or more cooking surfaces. In the case of waffle irons, grills and the like, these cooking surfaces usually form a part of cooking grids. Originally waffle irons and grills were separate appliances, however, the art has done considerable work toward the end of providing a single appliance which is capable of functioning both as a waffle iron and a grill. The solution which seems to show the most promise is that of providing reversible combination waffle and grill grids, wherein each grid has a waffle formation on one of its sides and a flat surface for grilling on its other side. The combination grids, in this arrangement, are detachably connected to the grill casing halves. When it is desired to use the appliance as a grill, the combination grids are mounted with their flat grill surfaces opposing each other. As will be readily appreciated, when it is desired to use the appliance as a waffle iron, the combination grids are reversed, i.e., removed from the casing halves, turned, and mounted with their waffle iron faces opposing.

In an appliance having reversible detachable combination grids, it is highly desirable that the manner of attachment to the casing halves be facile, the attachment be secure and safe, the attaching means blend into the overall appearance of the appliance so as not to be unsightly, and the cost of manufacture and assembly be maintained at a minimum.

It is an object of this invention to provide a mounting arrangement for combination grids of a cooking appliance, which will permit quick and easy reversal of the grids, is simple in construction, inexpensive in cost, and safe and reliable in operation.

The object of our invention is accomplished by locating one edge of a combination grid in a casing half, and latching an opposite edge of the grid to the casing half by a novel mounting clip.

Other objects and further details of that which I believe to be novel and my invention will be clear from the following description and claims taken with the accompanying drawing wherein:

Fig. 1 is a side elevation view of a cooking appliance having portions broken away and other portions shown in section.

Fig. 2 is a fragmentary elevation view showing portions of an appliance casing half, a combination grid and a mounting clip in assembled relationship.

Fig. 3 is a sectional view taken on line 3—3 of Fig. 2.

Fig. 4 is a perspective view of a mounting clip.

Referring to the drawings and particularly to Fig. 1, a cooking appliance 10 is shown, which generally comprises two casing halves 12 and 14 that are secured to each other on their rear sides by a hinge construction 16 which permits relative pivotal movement of the two halves. The hinge structure is not part of our invention, but is described and claimed in the copending application of Karl J. Fleming, Serial No. 382,262, filed September 25, 1953, now Patent No. 2,803,034, and assigned to the assignee of the present invention. Each of the casing halves is provided with a heating element, and the appliance has a heat control and appropriate electrical connections, none of which are shown as they form no specific part of our invention. In Fig. 1 a conventional control mechanism designated generally by reference numeral 18 is shown as being attached to the lower casing half 14. A plurality of supporting legs 20 are also attached to the lower casing half. A manual grip 22 is attached to the upper casing half 12 for the conventional purpose of permitting the user to grip it and separate the casing halves by moving the upper half upwardly and to the rear, thereby causing it to pivot on its hinge structure 16.

The casing halves themselves are substantially identical and, therefore, a description of the upper half will suffice to serve as a disclosure of both. Upper half 12 comprises a dished shell 24 of thin material which may be an appropriate metal or the like. The referred to heating element (not shown) is disposed in the cavity formed by the shell 24. The open side of the shell 24 faces downwardly and is closed by the reversible combination grid 26. It will be observed that the grid 26 has one face 28 (the upwardly facing one) which is substantially a flat surface, and another face 30, which has a plurality of raised enlargements and depressions in the conventional waffle grid form.

The structure described thus far may be considered to be the conventional setting for our invention, which relates to the manner of detachably mounting the grids on the casing halves. The forward edge of grid 26 supports a channel-shaped locator 32 in the form of a narrow channel-shaped member. One leg of locator 32 is adapted to seat in a narrow slot 34 formed in the front side of the casing half shell 24. The locator 32 may be separably or permanently secured to the grid rim flange 36 in any conventional manner. When the grid 26 is seated on the shell 12, its rim flange 36 surrounds the open edge 38 of the shell. The lower edge of grid rim flange 36 is recessed (not shown) to receive the lower leg of locator 32, the lower side of which lies in the plane of the lower edge of the grid rim flange. This permits the upper casing half 12 to fit flush against the lower casing half. It will be appreciated that the upper edge of the grid rim flange is recessed for the upper leg of locator 32 for the same purpose when the grid is reversed.

The rear side of the grid 26 is secured to the shell 12 by one of our novel mounting clips 40. The construction of the mounting clips can best be seen in Figs. 3 and 4. Each mounting clip 40 comprises a seating portion 42, a latching portion 44 and a connecting portion 46. These portions are formed by a bent strip of spring like or resilient metal or the like. Referring primarily to Fig. 3 and starting with the seating portion 42 it will be seen that one end of the strip of which the clip is made is bent into the form of an arcuate hook 48. The strip extends for some distance at a slight incline in one direction (to the left in Fig. 3) to form leg 50, and then is abruptly bent reversely at 52 and extends horizontally in the opposite direction to form leg 54. Legs 50 and 54 diverge and form the general outline of a wedge.

The leg 54 extends to a point 56 beyond the hook 48 and then bends downwardly substantially at a right angle to the leg 54. The strip extends vertically downwardly beyond hook 48 to thereby form the connecting portion 46. The lower end of connecting portion 46 bends at 58 substantially at a right angle to the connecting portion 46, extends horizontally for a short distance to form latching wall 60 and terminates in a rolled ear 62. The latching portion 44 comprises the latching wall 60 and the rolled ear 62.

The mounting clip 40 may be connected to the appliance in several ways. The upper half shell 24 is provided on its rear side with an opening 64 that is spaced from the edge 38. With the grid 26 mounted on the shell 24 so that the grid rim flange 36 seats about the edge 38, the mounting clip 40 is mounted on the parts by inserting the seating portion 42 into the opening 64 until the hook 48 seats on the edge of opening 64 nearest the edge 38. The width of opening 64 is less than the distance between the portions of the legs that are adjacent to the edges of the opening prior to insertion of the seating portion into the opening; therefore, it is necessary to compress the legs toward each other to accomplish insertion. Then the portion of the leg 54 in the vicinity of the bend 56 is pushed downwardly until the rolled ear 62 passes over the downwardly extending portion of grid rim flange 36. Then the connecting portion in the vicinity of bend 58 is pushed toward the front of the appliance until the rolled edge 62 snaps over the lower inner corner 66 of the grid rim flange and the latching portion 44 securely latches in place on the lower edge of the grid rim flange. Mounting is facilitated by the pivoting action of the clip about the point of contact between hook 48 and the edge of opening 64. During the steps of mounting, in order to compress the legs, the leg 54 is pressed toward the leg 50, and the inherent resistance of the wedge-like seating portion to alteration of its shape must be overcome. After the clip is fully mounted the leg 50 presses against the lower edge of opening 64 due to the spring action of the clip, thereby having the relative effect of forcing the remainder of the clip upwardly; the leg 54 is spaced from the upper edge of opening 64, hence the seating portion 44 positively grips the lower edge of the grid rim flange 36. To facilitate in seating clip 40 and to insure that none of the clip will protrude beyond the plane of the lower edge of the grid rim flange, recess 68 is formed in the lower edge of the grid rim flange to receive wall 60. This is particularly important when the appliance has two casing halves for it permits a flush fit between the casing halves when they are closed. For the same purpose, recess 69 is formed on the upper edge of the grid rim flange, in order to accommodate the wall 60 when the grid is reversed.

Removal of the clip is generally the converse of its mounting. The portion of leg 54 adjacent to bend 56 is pushed toward the grid until the rolled ear 62 clears the lower inner corner 66 of the grid rim flange 36; then the latching portion 44 is pulled away from the grid rim flange until it is free of it. During the preceding steps, the clip pivots about hook 48 and the lower edge of opening 64, and the spring action of the clip aids in its removal. The seating portion 42 may then be pulled out of the opening 64 or permitted to remain there in the event that the grid 26 is merely being reversed.

If the seating portion is permitted to remain in the opening 64, a second manner of mounting the clip may be employed. With the seating portion already mounted in the opening 64, the grid 26 may be positioned by the locator 32 and then positioned about the edge 38 of the upper half shell 24. It should be noted that when starting with the seating portion 42 of the clip 40 already mounted in the opening 64, the movement necessary to permit the grid to clear the latching portion 44, is one of pivoting, that is, when the connector portion 46 is pulled away from the appliance, the clip pivots about the point of contact between hook 48 and the edge of opening 64. After the grid rim flange is seated, the connecting portion 46 is then pivoted to its normal position. A slight amount of pushing on leg 50 near bend 56 toward the grid causes the latching portion to clear the lower edge of the grid rim flange, the rolled ear 62 snaps over the corner 66 and the wall 60 seats in one of the recesses in the lower edge of the grid rim flange. During this last mounting step, the clip pivots about the hook 48 and the lower edge of opening 64.

Regardless of which manner of mounting is employed, the clip can be mounted or dismounted very efficiently by the use of the thumb and forefinger. The forefinger to compress the wedge-shaped mounting portion 42 when that is necessary, by pushing the portion of leg 54 near bend 56 toward the grid, and the thumb to either push the latching portion 44 onto the grid rim flange, as by exerting force in the vicinity of the bend 58 toward the appliance, or to pull the latching portion 44 off the grid rim flange, as by gripping the rolled edge 62 and pulling away from the appliance. A particular feature which permits facile manipulation is the referred to pivoting action of the clip about the point of contact of the hook 48 and the lower edge of opening 64.

The mounting of grid 26 on the shell 24 of upper casing half 12 has been described in detail. It should be understood that lower grid 70 is mounted on lower casing half shell 72 by locator 74 and mounting clip 76 in the same manner. As a practical matter, due to the fact that the upper and lower shells are identical, the grids 26 and 70 may be mounted on either of them. This feature of grid interchangeability is another advantage of our invention.

It should be apparent that if desired, the locators may be dispensed with and mounting clips substituted therefor. We prefer to use a locator and a mounting clip for each grid, because the locators detract from the appearance of the appliance less than the mounting clip, and hence may be positioned at the front of the appliance. The locators serve the additional purpose of taking the major portion of the load, due to the fact that they are more rigid than the mounting clips and, therefore, preventing unintentional removal of the clips by the weight and momentum of the grid. This is particularly important in the case of the upper casing half which is subject to considerable movement. This is also important when the casing halves are opened after a waffle has been cooked, for the waffles sometimes adhere to the grids and might unseat the mounting clips if the stronger locators are not employed.

As will be evident from the foregoing description, certain aspects of my invention are not limited to the particular details of construction of the examples illustrated, and we contemplate that various and other modifications or applications will occur to those skilled in the art. It is, therefore, our intention that the appended claims shall cover such modifications and applications as do not depart from the true spirit and scope of our invention.

What we claim as new and desire to secure by Letters Patent of the United States is:

1. The combination of a planar member having a peripheral flange and a second member having a seating edge, said edge being of such size to seat within said peripheral flange, said first member pivotally secured to said second member at one end, the other end of said second member having an aperture spaced from said edge, a mounting clip for detachably securing the other end of said first member to said second member, said clip comprising a yieldable seating portion having means including a hook for engaging an edge of said aperture which is closest to said edge of said second member, a latching portion adapted to grip said first member, and a flexible intermediate portion connecting said other portions, said clip being dimensioned relative to said members in such a manner that said hook and said latching portion are biased into engagement with said members and the distance between the parts of said seating portion which are adjacent to the edges of said aperture is less than the width of said aperture after said clip is fully mounted and said members are detachably secured to each other, whereby said clip may be pivoted about said hook during mounting and removal of said clip.

2. A device as defined in claim 1 wherein said peripheral flange extends in both directions away from said planar member, and said latching portion is adapted to grip the part of the flange which extends away from said second member.

3. A device as defined in claim 1 wherein said seating portion includes a pair of diverging yieldable legs in the form of a wedge, and said hook is formed on the end of one of said legs.

4. A device as defined in claim 1 wherein said latching portion includes a bead for gripping said first member.

5. A cooking appliance comprising a dished shell having an edge defining an opening, a heating element in said shell and a grid for attachment to said shell to close said opening, said grid having a cooking surface on each of its sides and being adapted to be removably attached to said shell with either surface exposed to view, one end of said grid pivotally secured to said shell, an aperture in the other end of said shell spaced from said edge, a mounting clip for detachably securing said other end of said grid to said shell, said clip comprising a seating portion having means including a hook for engaging an edge of said aperture, a latching portion adapted to grip said grid, and a flexible intermediate portion connecting said other portions.

6. A device as defined in claim 5 wherein said one end of said grid is pivotally secured to said shell by a channel-shaped locator.

7. A cooking appliance comprising a pair of hinged casing halves, each half comprising a dished shell having an edge defining an opening, a heating element in said shell and a grid for attachment to said shell to close said opening, said grid having a cooking surface on each of its sides and being adapted to be removably attached to said shell with either surface exposed to view, one end of said grid pivotally secured to said shell, an aperture in the other end of said shell spaced from said edge, a recess formed on each side of said grid in the vicinity of said aperture, a mounting clip for detachably securing the other end of said grid to said shell, said clip comprising a seating portion having means including a hook for engaging an edge of said aperture, a latching portion adapted to latch in one of said recesses and grip said grid, and a flexible intermediate portion, whereby the grids on both of said halves are adapted to contact each other with a flush fit when the halves are closed.

8. A cooking appliance comprising a pair of identical, casing halves hinged to each other at one of their respective sides, each half comprising a dished shell having an edge defining an opening, a heating element in said shell and a grid for attachment to said shell to close said opening, each of said grids having a cooking surface on each of its sides, and means for removably attaching said grids to either of said shells with either surface exposed to view, said means comprising a channel shaped locator secured to one end of each of said grids, an aperture formed in one end of each of said shells whereby said one ends of said grids may be pivotally secured to said one ends of said shells and when so secured a leg of each of said channel shaped locators is disposed in one of said apertures and mounting clips for detachably securing the other ends of said grids to said shells, whereby each of said grids may be mounted on either of said shells, said halves being hinged at their rear sides, and said one end of each of said grids being disposed at the front sides of said halves.

9. The combination of a pair of members that are adapted to be detachably secured together and a mounting clip for detachably securing said members together, one of said members having an aperture spaced from an edge thereof that lies adjacent to the other of said members when the members are detachably secured to each other, said mounting clip comprising a seating portion adapted to be seated in said aperture, a latching portion adapted to grip said other member, and a flexible intermediate portion connecting said other portions, said seating portion being in the form of a pair of diverging yieldable legs, one of which has means including a hook for engaging an edge of said aperture which is closest to the other of said members when the members are detachably secured to each other, said mounting clip being dimensioned relative to said members in such a manner that said hook and said latching portion are biased into engagement with the said members and the distance between the portions of said legs which are adjacent to the edges of said aperture is less than the width of said aperture after said mounting clip is fully mounted and said members are detachably secured to each other, whereby said mounting clip may be pivoted about said hook during mounting and removal of said mounting clip.

References Cited in the file of this patent

UNITED STATES PATENTS

| | | |
|---|---|---|
| 944,022 | Eken | Dec. 21, 1909 |
| 2,074,475 | Jesser | Mar. 23, 1937 |
| 2,127,072 | Tinnerman | Aug. 16, 1938 |
| 2,457,360 | Flora | Dec. 28, 1948 |
| 2,474,158 | Neely | June 21, 1949 |
| 2,475,274 | Beckwith | July 5, 1949 |
| 2,495,848 | Kiesel | Jan. 31, 1950 |
| 2,520,725 | Judd | Aug. 29, 1950 |
| 2,588,145 | Miller | Mar. 4, 1952 |
| 2,596,438 | Rollings | May 13, 1952 |
| 2,597,541 | Squires et al. | May 20, 1952 |
| 2,625,080 | Ferlise | Jan. 13, 1953 |
| 2,784,663 | Rand et al. | Mar. 12, 1957 |